United States Patent
Nizza et al.

(10) Patent No.: US 10,110,399 B2
(45) Date of Patent: Oct. 23, 2018

(54) METHOD OF TRANSFERRING SIGNALS VIA TRANSFORMERS, CORRESPONDING CIRCUIT AND DEVICE

(71) Applicant: STMicroelectronics S.r.l., Agrate Brianza (IT)

(72) Inventors: Alessandro Nizza, Aosta (IT); Roberto Aletti, Aosta (IT); Francesco Pulvirenti, Acireale (IT); Giuseppe Cantone, Bareggio (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 15/601,299

(22) Filed: May 22, 2017

(65) Prior Publication Data

US 2018/0102922 A1    Apr. 12, 2018

(30) Foreign Application Priority Data

Oct. 12, 2016    (IT) .................. 102016000102282

(51) Int. Cl.

| | |
|---|---|
| *H04L 25/02* | (2006.01) |
| *H04B 1/58* | (2006.01) |
| *H04B 1/16* | (2006.01) |
| *H04B 1/38* | (2015.01) |
| *H04L 25/08* | (2006.01) |
| *H04B 3/46* | (2015.01) |
| *H04B 3/56* | (2006.01) |

(52) U.S. Cl.
CPC ....... *H04L 25/0266* (2013.01); *H04B 1/1607* (2013.01); *H04B 1/38* (2013.01); *H04B 1/581* (2013.01); *H04B 3/46* (2013.01); *H04B 3/56* (2013.01); *H04L 25/085* (2013.01)

(58) Field of Classification Search
CPC ..... H04L 25/0266; H04L 25/085; H04B 3/56; H04B 3/46; H04B 1/1607; H04B 1/581; H04B 1/38
See application file for complete search history.

(56) References Cited

U.S. PATENT DOCUMENTS

| | | | |
|---|---|---|---|
| 3,697,895 A * | 10/1972 | Beck ................ | H03H 7/48 333/124 |
| 4,087,701 A * | 5/1978 | Anderson ........... | H04B 3/56 307/149 |

(Continued)

*Primary Examiner* — Kenneth Lam
(74) *Attorney, Agent, or Firm* — Seed IP Law Group LLP

(57) ABSTRACT

A circuit with galvanic isolation includes a series of n cascaded transformers including a first transformer and a last transformer in the series. A transmitter is coupled to the primary winding of the first transformer in the series of cascaded transformers, the transmitter being configured for supplying to the primary winding a transmission signal as a function of an input signal. A receiver is coupled to the secondary winding of the last transformer of the series of cascaded transformers and is configured for receiving at the secondary winding a reception signal transmitted over the series of cascaded transformers. A predistortion module is configured for applying to the transmission signal a predistortion including an (n−1)-fold integration, where n is the number of cascaded transformers, of a transmission signal that would be supplied to the input of a sole transformer present in a single-transformer solution.

20 Claims, 2 Drawing Sheets

(56) References Cited

U.S. PATENT DOCUMENTS

| | | | | |
|---|---|---|---|---|
| 5,204,880 A | * | 4/1993 | Wurster | H04B 1/62 |
| | | | | 330/275 |
| 5,267,269 A | | 11/1993 | Shih et al. | |
| 9,267,972 B2 | * | 2/2016 | Rossi | G01R 3/00 |
| 2007/0258513 A1 | * | 11/2007 | Strzalkowski | H04L 25/085 |
| | | | | 375/219 |
| 2008/0113643 A1 | * | 5/2008 | Guan | H01P 5/10 |
| | | | | 455/323 |
| 2009/0202003 A1 | * | 8/2009 | Langner | H04B 3/06 |
| | | | | 375/257 |

* cited by examiner

METHOD OF TRANSFERRING SIGNALS VIA TRANSFORMERS, CORRESPONDING CIRCUIT AND DEVICE

BACKGROUND

Technical Field

The present description relates to methods for transferring electrical signals by the use of transformers.

One or more embodiments may be suitable for application, for example, to devices for transferring signals with galvanic isolation.

Description of the Related Art

Technological solutions based on galvanic isolation are the subject of increasing interest, with an increasing number of solutions in which, for example, it is desirable to be able to isolate electrically a power section, at high voltage, from a section where control signals are present, at a lower voltage.

These applications may be used, for example, to protect both control equipment and users when very high voltages are present.

In particular, it is possible to provide devices for transferring galvanically isolated signals by means of a transformer integrated into a semiconductor chip.

In this context, it is desirable to be able to produce devices capable of providing communication between two isolated "worlds" at up to 10 kilovolts (kV) or above.

The technology available at present to meet this requirement is rather complex and costly, whereas it is a relatively simple matter to produce integrated transformers with galvanic isolation up to about 6 kV. By using a series (cascade) of two or more integrated transformers, therefore, it is possible to reach or even exceed the isolation level of 10 kV.

BRIEF SUMMARY

One or more embodiments provide solutions that can be used to provide signal transfer, in a simple and reliable manner, via two (or more) transformers arranged in cascade.

The claims form an integral part of the technical teachings provided herein in relation to the embodiments.

One or more embodiments may therefore refer to the transfer of (digital) signals via a series or cascade of two or more transformers.

One or more embodiments may provide for a series or cascade of two or more transformers (of the coreless type, for example), which may be produced, for example, on various chips with the capacity to provide galvanic isolation up to 10 kV, for example.

One or more embodiments may provide, for example, for the use of a transmitter capable of generating a triangular current signal so as to obtain, at the output of the cascade of two transformers, a current signal similar to that which can be obtained with a single transformer.

BRIEF DESCRIPTION OF THE SEVERAL VIEWS OF THE DRAWINGS

One or more embodiments will now be described, purely by way of non-limiting example, with reference to the appended drawings, in which.

DETAILED DESCRIPTION

The following exposition illustrates various specific details intended to provide a deeper understanding of exemplary embodiments of the present description. One or more embodiments may be produced without one or more of the specific details, or with other methods, components, materials, etc. In other cases, known structures, materials or operations are not shown or described in detail, in order to avoid obscuring various aspects of the embodiments. The reference to "an embodiment" in this description is intended to indicate that a particular configuration, structure or characteristic described in relation to the embodiment is included in at least one embodiment. Therefore, phrases such as "in an embodiment", which may be present in various parts of this description, do not necessarily refer to the same embodiment. Furthermore, specific formations, structures or characteristics may be combined in a suitable way in one or more embodiments.

The references used herein are provided purely for convenience and therefore do not define the scope of protection or the extent of the embodiments.

Figure 1:
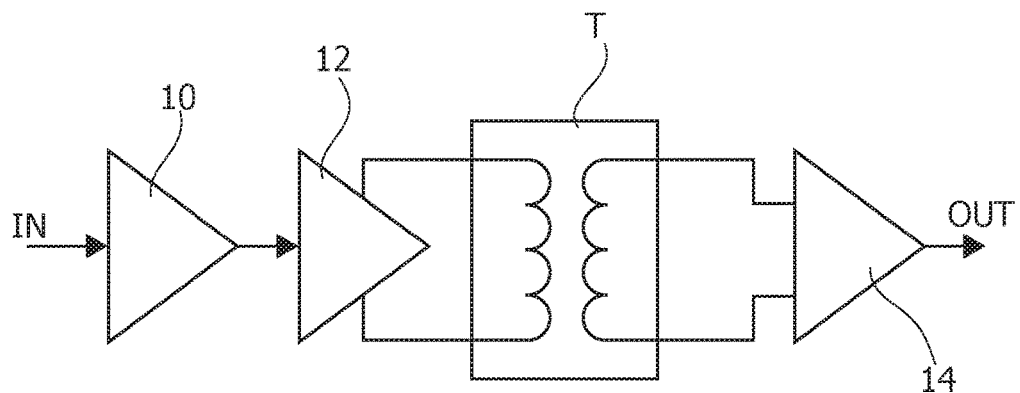
FIG. 1 is a block diagram illustrating the transfer of electrical signals via a transformer.

FIG. 1 is a block diagram illustrating the transfer of electrical signals via a (single) transformer T.

In the diagram of FIG. 1, the reference 10 indicates a processing circuit (controller) of a transmitter 12 which applies a (current) signal to the primary winding of the transformer T whose secondary winding, in its turn, drives a receiver (for example a transimpedance transformer or TIA) 14.

Figure 2:
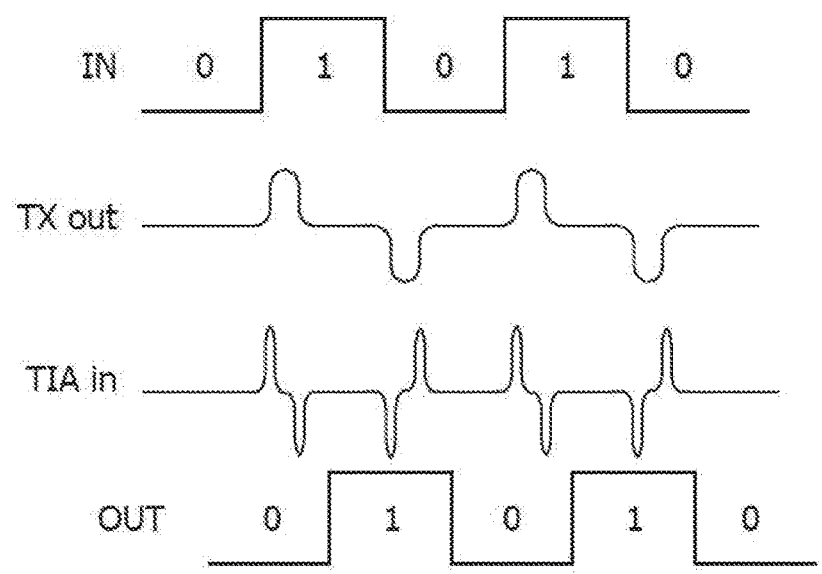
FIG. 2 is a timing diagram representative of the possible temporal trend of various signals in a circuit as shown by way of example in FIG. 1.

The timing diagram of FIG. 2 shows by way of example, from the top to the bottom, a possible temporal trend of the following signals:

IN: the (digital) signal forming the input to the processing circuit 10;

TX out: the (current) transmission signal forming the output of the transmitter 12;

TIA in: the (current) signal forming the input to the receiver 14; and

OUT: the output signal of the receiver 14.

The correspondence between the IN signal and the OUT signal exemplifies the possibility, in this single-transformer system, of producing the cells containing a transmitter and a receiver 14 in such a way as to obtain correct transmission and reception of the signal, that is to say with the possibility of reconstructing the (digital) input signal IN as the output signal OUT.

As can be seen in FIG. 2, a single transformer such as the transformer T behaves, in practice, as a derivative element for the current waveform that it receives at its input; that is to say, $$TIA\ in = \partial(Tx\ out)/\partial t$$

With a view to obtaining an output in the form of an easily readable signal (TIA in>>>>OUT) in a single-transformer solution, as shown by way of example in FIG. 1, it may be considered that the transformer T should be driven by the transmitter 12 with a transmission signal that may be seen, approximately at least, as a square wave signal, such as the signal indicated by TX out in FIG. 2.

In order to use a solution with two or more transformers in series (in cascade, that is to say with the secondary winding of an "upstream" transformer driving the primary winding of a "downstream" transformer) so as to increase the voltage capacity of the isolation, provision may be made, in one or more embodiments, to use (in the transmitter 12, for example) predistortion of the transmission signal TX out applied to the first transformer (T1 in FIG. 3), for the purpose of obtaining, at the input of the last transformer of the series or cascade (Tn in FIG. 3), a signal substantially similar to the signal that would be applied to this transformer Tn if it were the sole transformer interposed between the transmitter 12 (driven by a square wave signal, for example) and the receiver 14.

In particular, given that each transformer in a cascade of n transformers T1, ..., Tk, ... Tn (see FIG. 3 again) acts as a derivative element, in one or more embodiments the signal TX out may be subjected to a predistortion summarized by the following formula:

$$TX\ out = \int\int \ldots \int^{n-1} \psi(t) dt$$

where
$\psi(t)$ is the waveform (virtually square, for example) which allows satisfactory reading (TIA in>>>>OUT), and
n is the number of transformers (integrated transformers, for example) that are used.

Such predistortion may be provided in a known way, for example in a unit or module 12a, represented for clarity as a separate unit interacting with the transmitter 12.

Naturally, this representation is provided purely by way of example, since the predistortion unit may be incorporated in the transmitter 12 for all purposes, and since, theoretically at least, provision may be made in one or more embodiments to associate the predistortion function with the processing module or controller 10.

Regardless of the specific procedures adopted concerning the above matters, in one or more embodiments the (current) signal TX out that is to be supplied to the cascade of n transformers in series may be produced by (n−1)-fold integration of the current signals (of a virtually square wave type, for example) that are to be received at the input of the last transformer Tn of the cascade.

Figure 3:
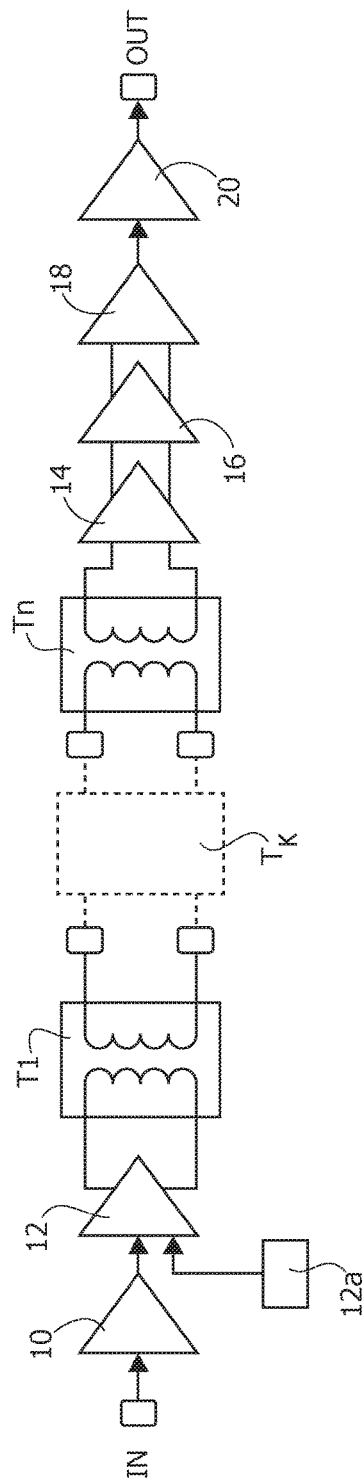
FIG. 3 is an exemplary block diagram of one or more embodiments.
Figure 4:
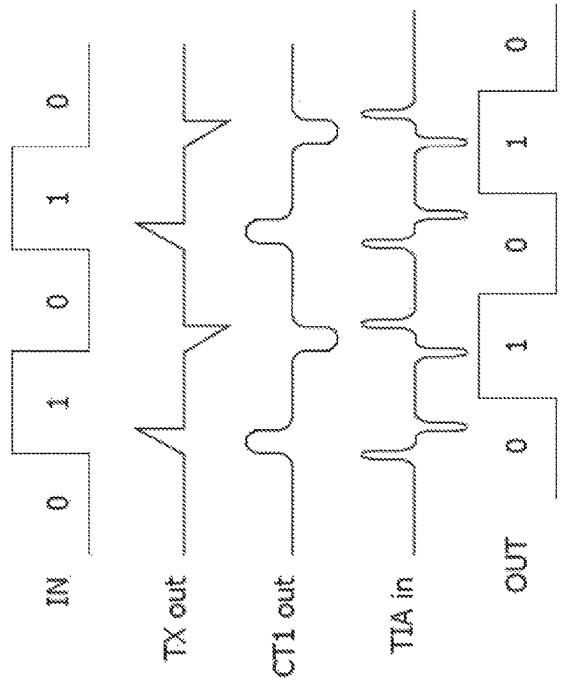
FIG. 4 is a timing diagram representative of the possible temporal trend of various signals in a circuit as shown by way of example in FIG. 3.

Considering, for example, the simple case of two transformers (that is to say, T1 and Tn, where n=2, in the exemplary diagram of FIG. 3), in one or more embodiments, the predistortion principle described above may operate in such a way that, given a square wave signal IN as shown at the top of the diagram in FIG. 4, the (current) signal TX out supplied to the transformer T1 at the input of the series of two transformers T1, T2 may be a wave which is, for example, at least approximately triangular, as shown in the diagram of FIG. 4, a triangular wave being the expression of the first-order integral of a square wave.

The third diagram in FIG. 4 is an example of a possible trend of the (current) signal CT1 out that may be present at the output (secondary winding) of a (first) transformer T1 to whose primary winding there is applied a triangular signal such as the signal TX out shown in the second diagram of FIG. 4.

The fourth diagram in FIG. 4 is an example of a possible trend of the (current) signal TIA in that may be present at the output (secondary winding) of a (second) transformer T2 to whose primary winding there is applied a (current) signal such as the signal CT1 out at the output of the first transformer T1, shown in the third diagram of FIG. 4.

By operating in this way, in one or more embodiments, an easily read signal TIA in ((TIA in>>>>OUT) may be obtained at the output of the series of two transformers T1, T2, this signal being very similar to that obtained from the single-transformer structure. See, for comparison, the last two diagrams of FIGS. 2 and 4.

The block diagram of FIG. 3 shows an example of a device as a whole, which may be reduced (except for the presence of two or more transformers) to the general diagram of FIG. 1, and which is therefore such that it comprises, for example, a processing circuit 10 of a transmitter 12, which supplies the primary winding of the first transformer T1 with a (current) transmission signal subjected to predistortion (unit 12a) according to the principles discussed above.

The whole arrangement is such that the secondary winding of the last transformer Tn of the series (for example the second transformer T2, in the case of a series or cascade of two transformers, as in the example to which the diagrams of FIG. 4 refer) drives a receiver 14 (for example a transimpedance transformer or TIA), followed if necessary by a demodulator realized by a voltage amplifier 16, a comparator 18 for performing the reading or demodulation function, and/or one or more processing stages 20 (for re-shaping or the like, for example) to produce the signal OUT on the basis of the signal TIA received on the secondary of the last transformer of the cascade (Tn, or T2 in the case where the cascade comprises two transformers T1 and T2).

A device as shown by way of example in FIG. 3 may be implemented in an integrated circuit (IC) and may be used, for example, for motion control functions and/or for various industrial applications such as switching circuits (switching regulators, Intelligent Power Switches—IPS, and other types).

A device as shown by way of example in FIG. 3 may be used to reach a total galvanic isolation of 10 kV with a performance comparable to the single-transformer solution.

One or more embodiments may therefore provide for a method comprising:
providing a series (for example T1, ..., Tk, ..., Tn) of n cascaded transformers comprising a first transformer (for example T1) and a last transformer (for example Tn) in the series,
supplying (for example 10, 12, 12a) to the primary winding of the first transformer in said series of cascaded transformers a transmission signal (for example TX out) as a function of an input signal (for example IN),
receiving at the secondary winding of the last transformer in said series of cascaded transformers a reception signal (for example TIA in) transmitted over said series of cascaded transformers,
wherein the method includes applying predistortion to said transmission signal (for example TX out), said predistortion including (n−1)-fold integration, wherein n is the number of transformers in said series of cascaded transformers, that is to say integrating the same number of times the signal that would be supplied to the input of the sole transformer present in a single-transformer solution.

One or more embodiments may provide for the recovery, for example, through receivers 16, 18, 20 to generate the output signal OUT, of said input signal from said reception signal (for example TIA in) transmitted over said series of cascaded transformers.

In one or more embodiments, said series of cascaded transformers may comprise a first transformer and a second transformer, said second transformer being the last transformer in the series, and said predistortion may comprise a single integration.

In one or more embodiments, said series of cascaded transformers may comprise a first transformer and a second transformer, said second transformer being the last transformer in the series, and the method may comprise generating said transmission signal (TX out) as a substantially triangular wave signal.

One or more embodiments may provide a circuit comprising:
- a series of n cascaded transformers including a first transformer and a last transformer in the series,
- a transmitter coupled to the primary winding of the first transformer in said series of cascaded transformers, said transmitter configured for supplying to said primary winding a transmission signal (for example TX out) as a function of an input signal,
- a receiver coupled to the secondary winding of the last transformer in said series of cascaded transformers, said receiver being configured for receiving at said secondary winding a reception signal transmitted over said series of cascaded transformers, and
- a predistortion module (for example 12a) configured for applying predistortion to said transmission signal (for example TX out), said predistortion including (n−1)-fold integration, wherein n is the number of transformers in said series of n cascaded transformers.

In one or more embodiments, said series of cascaded transformers may comprise a first transformer and a second transformer, said second transformer being the last transformer in the series, and said predistortion may comprise a single integration.

In one or more embodiments:
said series of cascaded transformers may comprise a first transformer and a second transformer, said second transformer being the last transformer in the series, and wherein:
said predistortion module is configured for generating said transmission signal (TX out) as a substantially triangular-wave signal.

In one or more embodiments, said series of cascaded transformers may comprise a series of integrated and/or coreless transformers.

In one or more embodiments, a device (with galvanic isolation, for example per motion control functions and/or for various industrial applications, such as switching circuits) may comprise:
- a circuit according to any one or more embodiments,
- a controller (for example 10) for said transmitter, said controller being configured for receiving a digital signal (for example IN) as said input signal,
- a demodulator (for example 16, 18, 20) coupled to said receiver, said demodulator being configured for recovering (for example OUT) said digital input signal from said reception signal transmitted over said series of cascaded transformers.

Provided that the basic principles of the present disclosure remain the same, the details of construction and the forms of embodiment may be varied to a more or less significant extent with respect to those which have been illustrated purely by way of non-limiting example, without thereby departing from the scope of the present disclosure.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   generating a transmission signal as a function of an input signal;
   applying predistortion to the transmission signal, the predistortion including (n−1)-fold integration of the input signal where n is a number of transformers in a series of cascaded transformers including a first transformer and a last transformer, each transformer including a primary winding and a secondary winding;
   supplying the transmission signal with the applied predistortion to the primary winding of the first transformer in said series of cascaded transformers;
   transmitting over the series of cascaded transformers the transmission signal with the applied predistortion to generate at the secondary winding of the last transformer in said series of cascaded transformers a reception signal.

2. The method of claim 1 further comprising recovering said input signal from said reception signal to provide an output signal.

3. The method of claim 2, further comprising selecting the number n of series cascaded transformers to provide a desired galvanic isolation between the input signal and the output signal.

4. The method of claim 3, wherein selecting the number n of series cascaded transformers to provide a desired galvanic isolation comprises selecting the number n to provide a galvanic isolation of approximately 10 kilovolts.

5. The method of claim 1 wherein said series of cascaded transformers includes a first transformer and a second transformer, said second transformer being the last transformer in the series, and wherein applying predistortion to the transmission signal comprises performing a single integration of the input signal.

6. The method of claim 1 wherein said series of cascaded transformers includes a first transformer and a second transformer, said second transformer being the last transformer in the series, and wherein generating said transmission signal and applying predistortion to the transmission signal comprises generating a substantially triangular-wave signal as the transmission signal with the applied predistortion.

7. A circuit, comprising:
   a series of n cascaded transformers including a first transformer and a last transformer in the series, each transformer including a primary winding and a secondary winding;
   a transmitter coupled to the primary winding of the first transformer in said series of n cascaded transformers, said transmitter configured to supply to said primary winding a transmission signal as a function of an input signal;
   a predistortion circuit configured to apply predistortion to said transmission signal, said predistortion including (n−1)-fold integration of the input signal;
   a receiver coupled to the secondary winding of the last transformer in said series of cascaded transformers, said receiver configured to receive at said secondary winding a reception signal generated in response to the transmission signal with the applied predistortion being communicated over said series of cascaded transformers.

8. The circuit of claim 7 wherein said series of cascaded transformers includes a first transformer and a second transformer, said second transformer being the last transformer in the series, and wherein said predistortion applied by the predistortion circuit comprises a single integration of the input signal.

9. The circuit of claim 7 wherein:
said series of cascaded transformers includes a first transformer and a second transformer, said second transformer being the last transformer in the series and
wherein said predistortion circuit is configured to generate a substantially triangular-wave signal that is supplied by the transmitter as the transmission signal.

10. The circuit of claim 7 wherein said series of cascaded transformers are integrated in a semiconductor chip.

11. The circuit of claim 10, wherein said series of cascaded transformers comprise coreless transformers.

12. The circuit of claim 7, wherein the transmitter includes the predistortion circuit.

13. A device, comprising:
a controller configured to receive a digital signal as an input signal and to provide a signal corresponding to the input signal on an output;
a plurality of transformers coupled in series and including a first transformer and a last transformer, each transformer including a primary winding and a secondary winding;
a transmitter having an input coupled to the output of the controller and having an output coupled to the primary winding of the first transformer, the transmitter configured to generate a transmission signal on the primary winding that is based on the signal on the output of the controller;
a predistortion circuit configured to apply predistortion to the transmission signal, the said predistortion including (n−1)-fold integration of the input signal;
a receiver coupled to the secondary winding of the last transformer, the receiver configured to receive a reception signal on the secondary winding that is generated in response to the transmission signal with the applied predistortion being communicated through the plurality of transformers coupled in series; and
a demodulator coupled to the receiver, the demodulator configured to generate an output signal corresponding to digital input signal in response to the reception signal.

14. The device of claim 13, wherein the processing circuit includes the predistortion circuit.

15. The device of claim 13, wherein the demodulator comprises voltage amplifier, a comparator, and a processing stage coupled in series.

16. The device of claim 13, wherein the plurality of transformers coupled in series are formed in a plurality of semiconductor chips.

17. The device of claim 13, wherein the plurality of transformers coupled in series includes two transformers and wherein the transmitter and predistortion circuit are configured to generate a sawtooth wave signal that is provided as the transmission signal.

18. The device of claim 13, wherein at least some of the plurality of transformers coupled in series comprise coreless transformers.

19. The device of claim 13, wherein each of the transmission and reception signals comprise a current signal.

20. The device of claim 13, wherein the receiver comprises a transimpedance amplifier.

* * * * *